(12) United States Patent
Bultman

(10) Patent No.: US 6,671,459 B1
(45) Date of Patent: Dec. 30, 2003

(54) DC MOTOR CONTROL METHOD AND APPARATUS

(75) Inventor: Robert Bultman, Prospect, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/609,193

(22) Filed: Jun. 30, 2000

(51) Int. Cl.⁷ .................................................. H02P 5/06
(52) U.S. Cl. ........................ 388/804; 318/138; 318/254; 318/432; 318/434; 318/599; 318/700; 388/811; 388/819
(58) Field of Search ................................ 318/138, 139, 318/254, 432, 599, 434, 700; 388/804, 811, 819

(56) References Cited

U.S. PATENT DOCUMENTS

| | | | | |
|---|---|---|---|---|
| 4,371,819 A | * | 2/1983 | Kaufmann | 318/341 |
| 4,570,110 A | * | 2/1986 | Bloom et al. | 318/313 |
| 4,605,885 A | * | 8/1986 | Mitsuhashi | 318/317 |
| 4,623,827 A | | 11/1986 | Ito | |
| 4,727,300 A | * | 2/1988 | Horikawa et al. | 318/326 |
| 4,808,895 A | * | 2/1989 | Fujita et al. | 318/384 |
| 4,897,778 A | | 1/1990 | Miyamoto et al. | |
| 5,023,924 A | * | 6/1991 | Tajima et al. | 388/811 |
| 5,298,840 A | * | 3/1994 | Yoshino et al. | 318/268 |
| 5,313,548 A | | 5/1994 | Arvidson et al. | |
| 5,433,541 A | * | 7/1995 | Hieda et al. | 400/279 |
| 5,489,831 A | * | 2/1996 | Harris | 318/701 |
| 5,744,927 A | * | 4/1998 | Hayashida | 318/599 |
| 5,821,708 A | | 10/1998 | Williams et al. | |

* cited by examiner

Primary Examiner—Robert E. Nappi
Assistant Examiner—Tyrone Smith
(74) Attorney, Agent, or Firm—H. Neil Houser, Esq.; Armstrong Teasdale LLP

(57) ABSTRACT

A method for maintaining a target speed of a DC motor includes the steps of obtaining a feedback signal from the motor corresponding to motor speed, measuring an actual time for a predetermined number of feedback pulses to be received, comparing the actual measured time with an expected time for the feedback pulses to be received when the rotor shaft is operating at the target speed, and adjusting the controller pulse-width variable signal in response to the compared actual time to the expected time. The drive signal is generated and adjusted by a microprocessor in response to the feedback pulses generated by a feedback element coupled to the motor.

18 Claims, 2 Drawing Sheets

DC MOTOR CONTROL METHOD AND APPARATUS

BACKGROUND OF THE INVENTION

This invention relates generally to DC motors, and, more specifically, to a method and apparatus for controlling a speed of a DC motor.

Modern appliances, such as a refrigerator, typically include a number of devices controlled by DC motors, such as, for example, an evaporator fan or circulation fans within refrigerator compartments. To meet increasingly stringent energy requirements and standards, the motors are to be operated at specific desired speeds. When run without feedback control, DC motor speed undesirably varies with an ambient operating temperature, leading to some performance fluctuation between substantially identical appliances with substantially identical motors. Using feedback control, uniform performance across a product line may be achieved and energy requirements may be satisfied despite fluctuating operating conditions.

Known feedback speed control methods for DC motors, however, tend to be relatively complicated and involve a variety of computations to be performed in small time periods. See, for example, U.S. Pat. No. 4,371,819. Thus, known feedback control methods present an appreciable computational load on a motor controller, which increases control complexity and decreases control response time to changing motor conditions.

Accordingly, it would be desirable to provide a feedback control method and apparatus for a DC motor that reduces a computational load on the controller, simplifies the control scheme, and increases control response time.

BRIEF SUMMARY OF THE INVENTION

In an exemplary embodiment, a method for maintaining a target speed of a DC motor having a rotatable motor shaft driven by a controller supplying a pulse-width variable drive signal includes the steps of obtaining a pulse feedback signal from the motor that corresponds to a number of revolutions of the motor shaft, measuring an actual time for a predetermined number of feedback pulses to be received by the controller, comparing the actual time for the predetermined number of pulses to be received with an expected time for the feedback pulses to be received when the rotor shaft is operating at the target speed, and adjusting the controller pulse-width variable signal in response to the compared actual time to the expected time. The width of the pulse-width variable signal is increased when the actual time is greater than the expected time, and decreased when the actual time is less than the expected time.

More specifically, a feedback signal including four pulses per revolution of the motor shaft is obtained, and an actual time to receive twenty feedback pulses is measured. If the actual time to receive a number of feedback pulses to be received exceeds a predetermined time period, a stalled motor is indicated and the pulse-width drive signal is increased to restart the motor. A proportional-integral control scheme based upon a difference, or error, between the expected time and the measured actual time is used to adjust the pulse-width drive signal when twenty pulses are counted within the predetermined time period. The drive signal is generated and adjusted by a microprocessor in response to the feedback pulses generated by a feedback element coupled to the motor.

Measuring an elapsed time for twenty feedback pulses to be received has an averaging effect on motor speed measurement, reduces a computational frequency, simplifies the control scheme, and accordingly reduces a computational load on the microprocessor relative to known speed control methods.

DETAILED DESCRIPTION OF THE INVENTION

Figure 1:
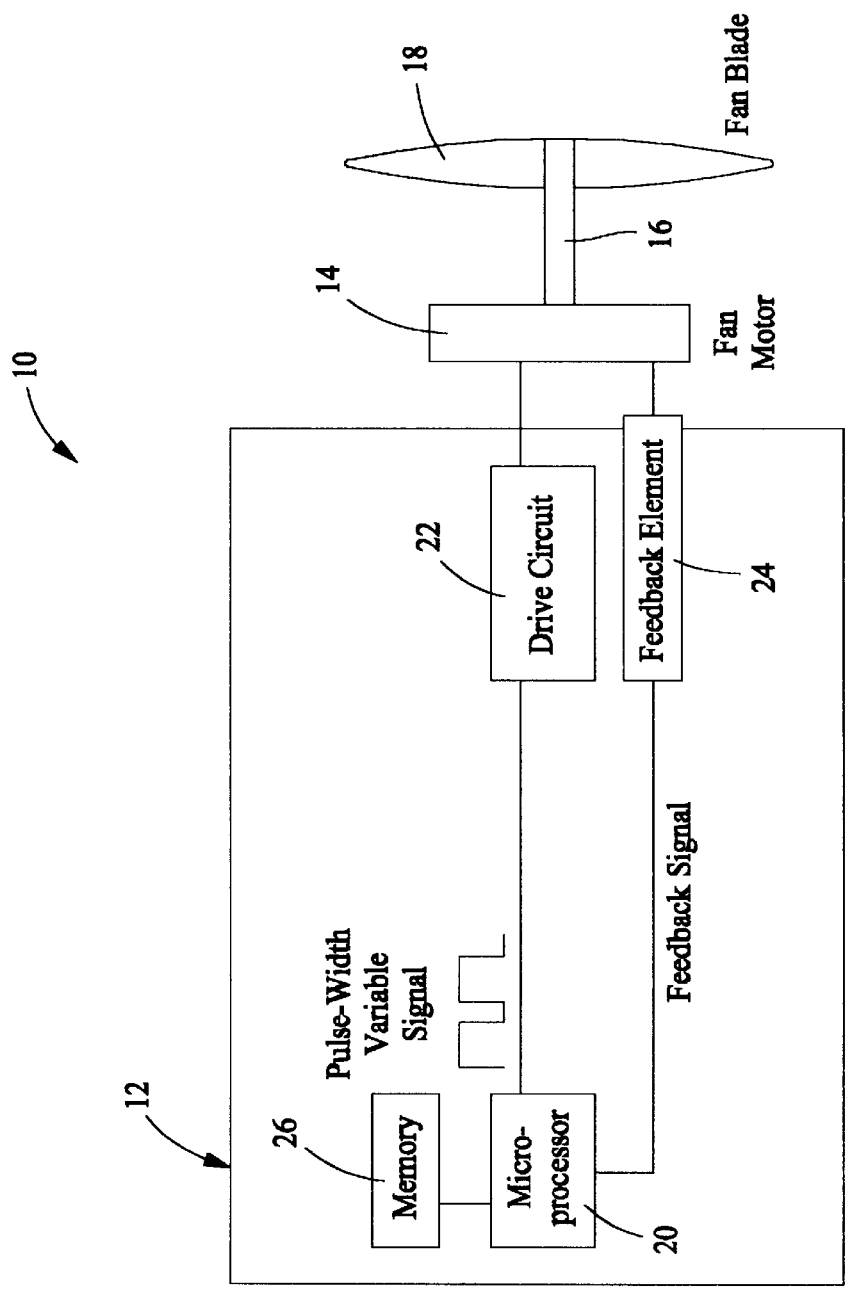
FIG. 1 illustrates a speed control system for a system including a DC motor.

FIG. 1 is block diagram of a speed control system 10 including a DC motor 12 and a controller 14. In one embodiment, motor 12 is a known self commutated, permanent magnet DC motor including a rotatably mounted motor shaft 16 which rotates or spins when motor is energized to drive a component, device, accessory or other component coupled to motor shaft 16, such as a fan blade 18 typically used in refrigeration applications. It is contemplated, however, that the benefits of the present invention accrue to other types of DC motors and/or DC motors used in other applications, including non-appliance applications, where precise speed control is desirable. Therefore, the accompanying description and illustration of a fan motor 14 is for illustrative purposes only and is not intended to limit the present invention in any aspect.

Controller 12 includes a microprocessor 20 operatively coupled to a drive circuit 22, which is, in turn, connected to motor 14. Microprocessor 20 generates a pulse width variable signal that is input to drive circuit 22 which accordingly energizes motor 14 and causes motor shaft 16 to rotate, thereby spinning fan blade 18 and displacing air. In one embodiment, microprocessor 20 and drive circuit 22 employ pulse width modulation to drive motor 14 at a high speed, a medium speed, and a low speed. While multi-speed operation of motor 14 is desirable in certain applications, such as in a refrigeration system, the present invention is applicable to single speed, multi-speed, and variable speed motor drives and circuits in which precise motor speed control is desired.

A feedback element 24 is coupled to motor 14 and generates a signal corresponding to an operating speed of motor 14. In one embodiment, feedback element 24 is a known encoder that is coupled to motor shaft 16 and configured to generate a number of pulses per revolution of motor shaft 16, such as five pulses per revolution. In alternative embodiments, other known feedback elements 24 are used to sense an operating speed of motor shaft 16 and generate proportional pulse feedback signals to microprocessor 24. One such example is a Hall-effect switch located on motor shaft 16 or elsewhere on motor 14.

A memory 26 is coupled to microprocessor 20 for storing target motor speed indicator values. In one embodiment, memory 26 is an electrically erasable programmable read-only memory (EEPROM). Other known types of memory 26 are employed in alternative embodiments for storing target motor speed indication data and other data as necessary to control an operating speed of motor 14.

In one embodiment, microprocessor 20 monitors motor speed by measuring an elapsed time for a predetermined number of feedback pulses to be received. At a given desired motor speed (i.e., revolutions per minute), an expected time for a given amount of feedback pulses to be received may be calculated. In one embodiment, expected times for microprocessor 20 to receive twenty feedback pulses is stored in memory 26 and are as follows for a three speed motor 14:

| MOTOR SPEED | EXPECTED TIME FOR 20 FEEDBACK PULSES |
|---|---|
| Low (900 rpm) | 333 ms |
| Medium (1730 rpm) | 173 ms |
| High (2300 rpm) | 130 ms |

By comparing the measured time with the expected time, it is determined whether the actual motor speed is above or below the target speed, and the pulse-width variable input signal may be adjusted accordingly.

Figure 2:
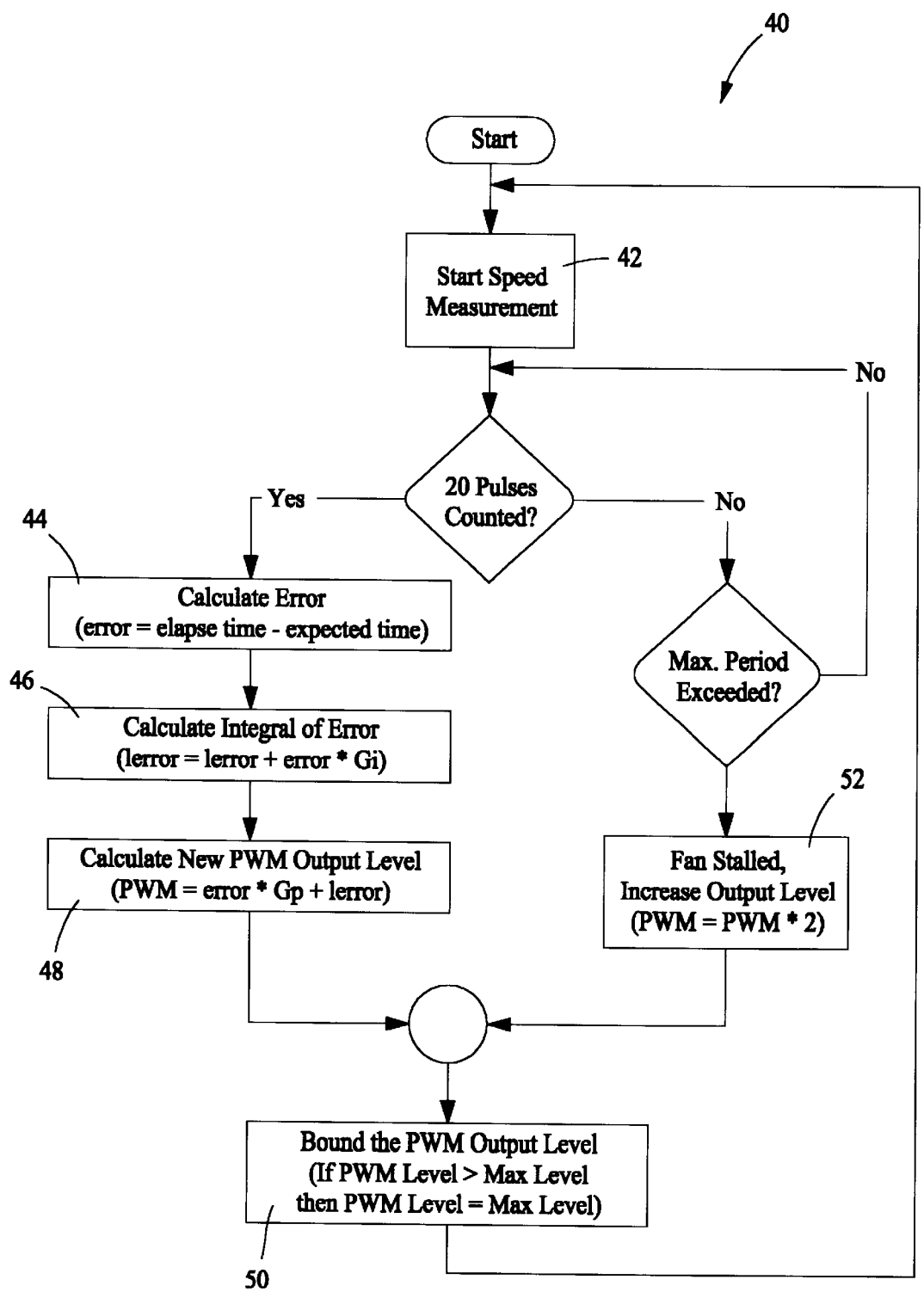
FIG. 2 is a speed control algorithm flow chart for the system shown in FIG. 1.

FIG. 2 illustrates a speed control algorithm 40 for speed control system 10 (shown in FIG. 1). When accurate motor speed control is desired, microprocessor 20 (shown in FIG. 1) starts 42 a speed measurement by counting a predetermined number of feedback pulses and measuring an elapsed time for the predetermined number of pulses to be received. In one embodiment, microprocessor 20 counts twenty feedback pulses, which correspond to five revolutions of motor shaft 16 (shown in FIG. 1). Microprocessor 20 adjusts the pulse-width variable signal input to drive circuit 22 (shown in FIG. 1) to obtain a desired motor target speed as described below.

If microprocessor 20 counts twenty pulses in a time period that does not exceed a predetermined maximum period, microprocessor 20 adjusts the pulse-width variable input signal as follows. An error value, or the difference between the measured elapsed time to count the pulses and the expected time stored in system memory for the pulses to be received, is calculated 44. An integral of the error (Ierror) is then calculated 46 by multiplying the error value by an integral gain value (Gi) of controller 12 (shown in FIG. 1) and algebraically adding a last previously determined Ierror value from a prior calculation loop (zero for the first loop in a speed measurement session). Thus, Ierror is iteratively, or cumulatively calculated 46 for adjustment of the pulse-width input signal based at least in part on previously calculated 44 error values.

Once Ierror is calculated 46, a new pulse width variable signal is calculated 48 by multiplying the calculated error value by a proportional gain value (Gp) of control system and algebraically adding the current Ierror value from the present loop. The calculated pulse-width variable input signal is bound 50 by a predetermined maximum output level, and if the calculated pulse-width input signal equals or exceeds the maximum pulse width signal output level, the maximum pulse-width output signal is generated by microprocessor 20 and input into drive circuit 22. When maximum pulse-width output level is greater than the calculated pulse-width variable signal, the calculated pulse-width signal is generated by microprocessor 20 and input into drive circuit 22.

If twenty pulses are not counted within the predetermined maximum period, such as one second, a stalled motor is indicated. In such a case, the current pulse-width output level is doubled 52 to start the stalled motor 14 quickly. The doubled pulse-width variable input signal is bound 50 by a predetermined maximum output level, and if the doubled pulse-width input signal equals or exceeds the maximum pulse-width signal output level, the maximum pulse-width output signal is generated by microprocessor 20 and input into drive circuit 22. When the calculated maximum pulse-width output level is greater than the doubled pulse width variable signal, the doubled signal is generated by microprocessor 20 and input into drive circuit 22.

Once the pulse width variable input signal is adjusted, a new speed measurement cycle is started 42, twenty feedback pulses are counted and the input signal adjusted again if necessary. It is seen that when the measured time period to receive the twenty pulses is longer than expected, the width of the pulse-width input signal is increased, thereby increasing the applied voltage and increasing the speed of motor 14. Also, if the measured time period to receive twenty pulses is less than expected, the width of the pulse-width input signal is decreased, thereby decreasing the applied voltage and lowering motor speed. As the error between the measured time and the expected time approaches zero, the adjusted pulse-width input signal converges with the present input signal at each calculation loop, and motor 14 reaches a steady state at the target speed.

The above-described control system 10 employs a proportional-integral control scheme to control motor speed. It is appreciated, however, that other known control schemes could be used in alternative embodiments, including but not limited to proportional-integral-derivative schemes, and fuzzy logic control.

Moreover, the above-described control system 10 counts twenty feedback pulses to determine and adjust motor speed, thereby providing an averaging effect on motor speed and measurement while facilitating acceptable system response and reducing a controller computational load. It is contemplated, however, that greater or fewer numbers of pulses could be counted in alternative embodiments to change the response of control system 10 and vary the computational load on microprocessor 20 within the scope of the present invention.

While the invention has been described in terms of various specific embodiments, those skilled in the art will recognize that the invention can be practiced with modification within the spirit and scope of the claims.

What is claimed is:

1. A method for maintaining a target speed of a DC motor, the motor including a rotatable motor shaft driven by a controller supplying a pulse-width variable drive signal, said method comprising the steps of:

obtaining a feedback signal from the motor, the feedback signal including a number of pulses corresponding to a number of revolutions of the motor shaft;

measuring an actual time for a predetermined number of feedback pulses to be received by the controller;

comparing the actual time for the predetermined number of pulses to be received with an expected time for feedback pulses to be received when the motor shaft is operating at a target speed; and adjusting the controller pulse-width variable signal in response to the compared actual time to the expected time.

2. A method in accordance with claim 1 wherein said step of adjusting the controller pulse-width variable signal comprises the step of increasing the controller pulse-width variable signal when the actual time is greater than the expected time.

3. A method in accordance with claim 1 wherein said step of adjusting the controller pulse-width variable signal comprises the step of decreasing the controller pulse-width variable signal when the actual time is less than the expected time.

4. A method in accordance with claim 1 wherein said step of obtaining a feedback signal comprises the step of obtaining a feedback signal including four pulses per revolution of the motor shaft.

5. A method in accordance with claim 1 wherein said step of measuring a time for a predetermined number of feedback pulses to be received by the controller comprises the step of measuring a time for twenty pulses to be received.

6. A method in accordance with claim 1 further comprising the step of increasing the pulse-width variable signal of the controller when an actual time for a predetermined number of feedback pulses to be received exceeds a predetermined value.

7. A method in accordance with claim 1 wherein said step of adjusting the controller pulse-width variable signal of the controller comprises the step of adjusting the controller pulse-width variable signal based upon a proportional-integral control scheme.

8. A control system for a permanent magnet DC motor, the motor including a rotatable motor shaft, said controller comprising:
   a feedback element configured to generate a number of pulses corresponding to an operating speed of the motor; and
   a microprocessor coupled to said feedback element and configured to generate a pulse-width variable signal to the motor and to receive a feedback signal from the feedback element, said microprocessor programmed to measure an actual time to receive a predetermined number of pulses from said feedback element, compare the actual time for the predetermined number of pulses to be received with an expected time for feedback pulses to be received when the motor shaft is operating at a target speed, and to adjust the pulse-width variable signal to the motor in response to the measured time.

9. A control system in accordance with claim 8 further comprising a memory, said memory loaded with the expected time for the predetermined number of pulses to be received when the motor is operating at a target speed.

10. A control system in accordance with claim 9 wherein said microprocessor is programmed for proportional-integral control of said pulse-width variable signal based upon a difference between measured time and expected time.

11. A control system in accordance with claim 9, said microprocessor further programmed to increase the pulse-width variable signal when the actual time is greater than the measured time.

12. A control system in accordance with claim 9, said microprocessor further programmed to decrease the pulse-width variable signal when the actual time is less than the predetermined time.

13. A speed control system comprising:
   a DC motor comprising a rotatable motor shaft;
   a feedback element coupled to said motor shaft and configured to generate a number of pulses corresponding to an operating speed of the motor; and
   a microprocessor coupled to said feedback element and configured to generate a pulse-width variable signal to the motor and to receive a feedback signal from the feedback element, said microprocessor programmed to measure an actual time to receive a predetermined number of pulses from said feedback element, to compare the actual time for the predetermined number of pulses to be received with an expected time for feedback pulses to be received when the motor shaft is operating at a target speed, and to adjust the pulse-width variable signal to the motor in response to the measured time.

14. A speed control system in accordance with claim 13 wherein said motor comprises a self commutated, permanent magnet, DC motor.

15. A sped control system in accordance with claim 13 further comprising a memory, said memory loaded with the expected time for the predetermined number of pulses to be received when the motor is operating at the target speed.

16. A speed control system in accordance with claim 15, said microprocessor further programmed to increase the pulse-width variable signal when the actual time is greater than the measured time.

17. A speed control system in accordance with claim 15, said microprocessor further programmed to decrease the pulse-width variable signal when the actual time is less than the predetermined time.

18. A control system in accordance with claim 9 wherein said microprocessor is programmed for proportional-integral control of said pulse-width variable signal based upon a difference between measured time and expected time.

* * * * *